United States Patent [19]
Ossman, Jr.

[11] 3,924,459
[45] Dec. 9, 1975

[54] TORQUE SENSOR WITH MEANS FOR MECHANICAL DAMPING

[75] Inventor: John W. Ossman, Jr., Clifton, N.J.

[73] Assignee: Haake, Inc., Saddle Brook, N.J.

[22] Filed: Nov. 13, 1974

[21] Appl. No.: 523,348

[52] U.S. Cl............................................. 73/136 R
[51] Int. Cl.².......................................... G01L 3/02
[58] Field of Search............... 73/136 R, 141 A, 144

[56] References Cited
UNITED STATES PATENTS

| | | | |
|---|---|---|---|
| 2,472,047 | 5/1949 | Ruge | 73/141 A |
| 2,836,061 | 5/1958 | Deavers | 73/136 R |
| 2,979,943 | 4/1961 | Gualtieri | 73/136 R |
| 3,224,262 | 12/1965 | Shipley | 73/136 R |
| 3,512,595 | 5/1970 | Laimins | 73/141 A X |
| 3,628,376 | 12/1971 | Dega et al. | 73/144 |

Primary Examiner—Charles A. Ruehl
Attorney, Agent, or Firm—Silverman and Jackson, Esqs.

[57] ABSTRACT

The present invention teaches the use of a selectably exchangeable load cell which is activated by the downward thrust of a plunger transversely attached to the center or idler gear of a three-gear rotating train. The downward thrust is a direct linear function of the load which is applied to the driven gear. Further, a mechanical damping means is utilized in order to eliminate gear and bearing noise in the electrical signal. The use of mechanical damping, as opposed to an electronic filter, preserves a fast response time to changes in torque upon the driven gear.

3 Claims, 2 Drawing Figures

TORQUE SENSOR WITH MEANS FOR MECHANICAL DAMPING

BACKGROUND OF THE INVENTION

The present invention relates to a means for the measurement of torque transmitted through a train of rotating mechanical elements, such as a set of meshed gears.

The measurement of torque transmitted through a system of rotating elements has been considered a formidable engineering problem. This is due to the fact that torque must be measured when the rotating elements are in motion while the measuring instrument or device must be stationary in order to be observed.

In response to this problem various systems have been proposed for the measurement of transmitted torque. Many of these are based upon the principle of a torsional twisting of a shaft. For example, strain gauges have been used with such a system in order to measure the deflections of a torsional twisting; however, in such a system, slip rings are necessary in order to conduct the electrical signals to a stationery instrument. Also, most slip ring systems are beset by problems of excessive ring noise. In addition, the sensitivity of such systems is limited by the inherent non-linearity which appears in torsional and slip ring elements.

Another approach to the problem of torque measurement has involved the use of a hydraulic piston which is transversely coupled to a center gear of a three-gear system. In this approach, three gears are successively engaged: these are a drive gear, an idler gear and a driven gear. When the rotating power is applied to the drive gear, a thrust, perpendicular to the plane of the axis of the three gears, will develop against the idler gear. The magnitude of said thrust is directly proportional to the load which is applied to the driven gear.

This principle is illustrated in the patent to Gualtieri, U.S. Pat. No. 2,979,943: Through the use of a double-acting piston and cylinder, changes in the pressure upon the hydraulic piston are measured. One limitation of this approach is its impracticality with regard to the measurement of different ranges of measurement of torque. That is, once the hydraulic piston is installed, there is no simple way of removing it in order to effectuate torque measurement within a range either above or below the sensing capability of the piston. Furthermore, in the hydraulic piston approach, it is necessary to provide a hydraulic seal which is sufficiently tight in order to prevent the leakage of hydraulic fluid. However, the tighter such a seal becomes, the greater is the sacrifice of sensitivity which results. Accordingly, most hydraulic piston systems of torque measurement are not capable of precision measurements.

Another approach to the sensing of dynamic torque within a gear train appears in the patent to Shipley, U.S. Pat. No. 3,244,262. This patent, as in Gualtieri, utilizes a three-gear combination of a drive, idler and driven gear. However, in Shipley, a strain gauge is formed within the intermediate, or idler, gear. The purpose of the strain gauge is to directly sense the pressure exerted upon the idler by the driver and driven gears. This pressure is directly exerted against a pair of electrical bridge resistances which are in intimate contact with the inside wall of the hollow idler gear. Accordingly, any surface deformation, which results from torque-created pressure, will change the values of said resistances. Through appropriate calibration, such changes in resistance can be expressed in terms of changes in torque.

The above approach of Shipley requires that the surface of the idler gear actually experience deformation in order to produce an electrical signal. It is obvious that this requirement places a rather clear limitation upon the sensitivity of measurement that such an approach can produce. In addition, the range of torque measurement is strictly limited to the values of the particular resistances utilizes within the idler gear.

Accordingly, it can be appreciated that the prior art has failed to provide a torque sensing device having a broad range of measurement capability as well as a sufficient sensitivity of measurement within any desired range of torque.

SUMMARY OF THE INVENTION

An object of the present invention is to provide an improved means for the dynamic measurement of torque transmitted through a rotating power train, such as a set of meshed gears.

Another object of the present invention is to provide a torque measuring means having a capability of virtually unlimited range of measurement.

A further object is to provide an improved torque measuring means having an improved sensitivity within any given range of values.

A yet further object is to provide a means for torque measurement in which the presence of bearing noise and mechanical chatter is eliminated as a potential error factor in the output, without the use of electrical damping which would otherwise introduce a time lag into the output.

A yet further object of the present invention is to provide a torque sensor having a strong, clear signal and a fast response time to changes in load, and which is suitable for performing measurements as are required in rheological studies relative to the operation of mixers, rotors, extruders and the like.

DETAILED DESCRIPTION OF THE INVENTION

Figure 1:
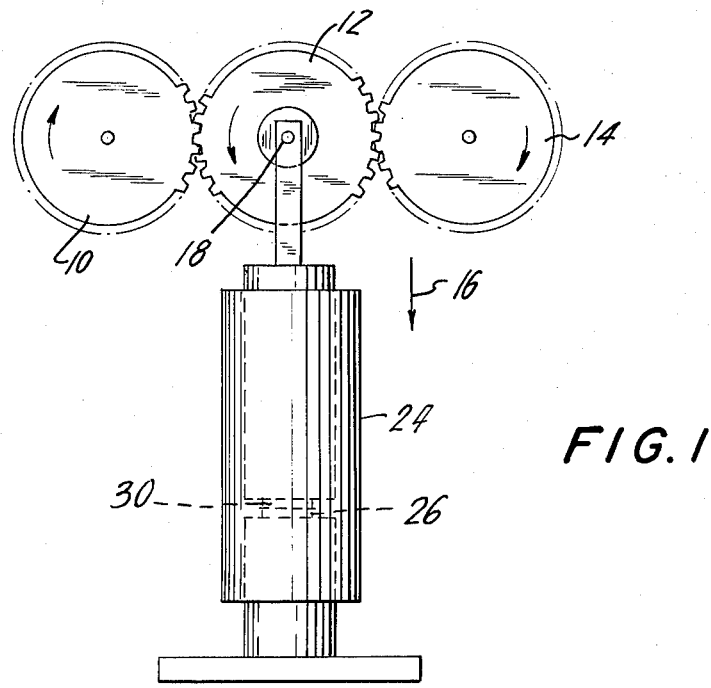
FIG. 1 is a front schematic view representing the principle of the present invention.

Shown in FIG. 1 is a drive gear 10 which rotates in a clockwise direction in order to engage an idler gear 12 which is thereby caused to rotate in a counter-clockwise direction. Said idler 12 then engages a driven gear 14 which is thereby caused to rotate in a clockwise direction.

Upon the addition of a mechanical load to the driven gear 14, a downward thrust will be created upon the idler gear 12 in a direction perpendicular to the plane formed by the axes of said three gears. The direction of this thrust is determined by the direction of rotation of said gears and is directly proportional to the load, and its associated torque, which is applied.

Where the drive gear 10 rotates in a counter-clockwise direction, the direction of thrust from idler gear 12 will be downwards as is indicated by arrow 16. However, where the direction of drive gear 10 is reversed, the direction of the force indicated by arrow 16 will be reversed.

With regard to the mechanical principles which govern the present invention, it will be appreciated that the gear intermesh between the drive gear 10, the idler gear 12 and the driven gear 14 causes the idler 12 to act as a lever between the two outer gears 10 and 14. A center shaft 18 (or axis) of the idler 12 acts as the fulcrum of the lever. When a rotational force is applied to the drive gear 10 and a drag or resistance to rotation, that is, a torque, is applied to the driven gear 14, the idler 12 acts to exert a force against the theoretical fulcrum connecting gears 10 and 14.

Figure 2:
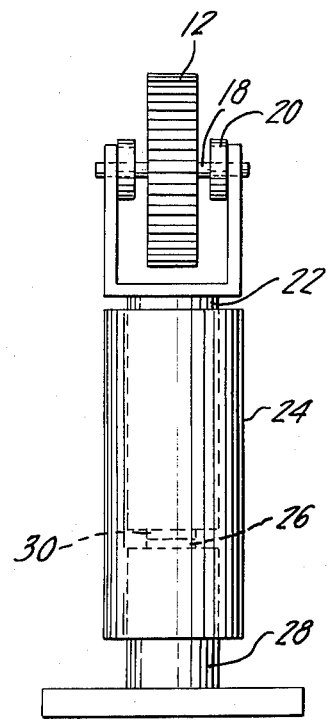
FIG. 2 is a side schematic view of the present invention.

Referring to FIG. 2, it is seen that the mounting shaft 18 and its associated ball bearings 20 are independently supported by a fork and plunger combination 22 which is free to move in the direction of thrust within a vertical guide 24.

The bottom of the plunger 22 is supported by an exchangeable load cell 28. Said load cell (or pressure transducer) is energized by a power supply (not shown). The signal from said load cell is then fed into a recorder or meter readout. Also, the electrical signal may be used as an alarm or control signal as, for example, in quality control applications involving the measurement of the viscosity or plasticity of materials, such as plastic, passing through a mixer, rotor, extruder or similar apparatus.

Load cells such as cell 28 are available in various degrees of pressure sensitivity, and are easily interchangeable within the configuration of the present invention. Accordingly, the present inventive design can be utilized for purposes of measurement of virtually any range of dynamic mechanical torque.

In order to obtain a clear, strong signal, not effected by such factors as vibration or gear and bearing noise, a mechanical damper, filter or shock absorber is interposed between the contact point 30 of the plunger 22 and the load cell 28. Said mechanical damper will generally take the form of a flat piece of elastomer material 26. The thickness and durometer rating of the material 26 will depend upon the degree of noise filtering which is required.

Through the use of such a mechanical damper, the need for an electronic noise filter at the output of the load cell 28 is obviated. Accordingly, a time lag will not be introduced into the final read-out of the system.

It is thus seen that the object of obtaining an improved means and method for the measurement of dynamic mechanical torque has been efficiently attained by the above-described embodiments of the present invention.

While there have been herein shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea of principles of this invention within the scope of the appended claims.

Having thus described my invention what I claim as new, useful and non-obvious and accordingly secure by letters patent of the United States, is:

1. A system for dynamically sensing mechanical torque in a gear train, comprising:
   a. a drive gear capable of a rotational momentum in a first direction;
   b. an idler gear disposed in adjacent engagement with said drive gear and intermeshed with said drive gear such that the angular momentum received from said drive gear is mechanically translated into a second direction of rotation which is opposite to said first direction of said drive gear;
   c. a driven gear disposed in adjacent engagement with said idler gear and intermeshed with said idler gear such that the angular momentum received from said idler gear is mechanically translated into an angular direction opposite to the direction of rotation of said idler gear, and in which said driven gear is capable of engaging a mechanical load;
   d. a plunger, physically coupled with said idler gear, wherein a differential change in angular momentum between said drive gear and said driven gear, said change resulting from a change in torque of the driven gear, will cause a transverse displacement of said idler gear with respect to a line of reference passing through the axes of said drive and driven gears;
   e. a replaceable load cell, disposed upon the longitudinal axis of said plunger, said load cell comprising a pressure transducer which will generate an electrical signal having an amplitude which is directly proportional to the pressure applied to said cell;
   f. a mechanical damper interposed between the bottom of said plunger and said replaceable load cell, wherein said mechanical damper serves to absorb unwanted gear and bearing noise from said gear train, thereby enhancing the quality of the electrical signal obtained from said load cell.

2. The system as recited in claim 1 in which said mechanical damper comprises an elastomer material, the thickness and durometer ratios of which shall depend upon the amount of mechanical damping required in a given system.

3. A method for dynamically sensing mechanical torque in a gear train in which said gear train includes: a drive gear capable of a rotational momentum in a first direction; an idler gear disposed in adjacent engagement with said drive gear and intermeshed with said drive gear such that the angular momentum received from said drive gear is mechanically translated into a second direction of rotation which is opposite to said first direction of said drive gear; a driven gear disposed in adjacent engagement with said idler gear and intermeshed with said idler gear such that the angular momentum received from said idler gear is mechanically translated into an angular direction opposite to the direction of rotation of said idler gear, and in which said driven gear is capable of engaging a mechanical load; in which said method comprises the steps of:
   a. mechanically coupling a plunger to said idler gear wherein a differential change in angular momentum between said drive gear and said driven gear, said change resulting from a change in torque of the driven gear, will cause a transverse displacement of said idler gear with respect to a line of reference passing through the axes of said drive and driven gears;
   b. inserting a replaceable load cell, disposed upon the longitudinal axis of said plunger, said load cell comprising a pressure transducer which will generate an electrical signal having an amplitude which is directly proportional to the pressure applied to said cell; and
   c. interposing a mechanical damper between the bottom of said plunger and said load cell in order to absorb gear and bearing noise which would otherwise impare the quality of the electrical output of said load cell.

* * * * *